United States Patent
Jovanovic

(10) Patent No.: US 7,039,410 B2
(45) Date of Patent: May 2, 2006

(54) METHOD OF HANDOFF AT THE BORDER BETWEEN CDMA UNDERLAY AND OVERLAY SYSTEMS

(75) Inventor: Vladan Jovanovic, Morris Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 349 days.

(21) Appl. No.: 10/420,599

(22) Filed: Apr. 22, 2003

(65) Prior Publication Data

US 2004/0214575 A1    Oct. 28, 2004

(51) Int. Cl.
*H04Q 7/36* (2006.01)

(52) U.S. Cl. ............................. 455/444; 455/446

(58) Field of Classification Search ............... 455/444, 455/447, 450, 453, 422, 442, 511, 446, 509
See application file for complete search history.

(56) References Cited

U.S. PATENT DOCUMENTS

| | | | |
|---|---|---|---|
| 5,557,657 A | 9/1996 | Barnett | 379/60 |
| 6,091,955 A | 7/2000 | Aalto et al. | 455/447 |
| 6,405,046 B1 * | 6/2002 | Kumaran et al. | 455/453 |
| 6,430,168 B1 * | 8/2002 | Djurkovic et al. | 370/331 |
| 2002/0067707 A1 | 6/2002 | Morales et al. | 370/331 |
| 2002/0172217 A1 * | 11/2002 | Kadaba et al. | |
| 2003/0067896 A1 * | 4/2003 | Chuah et al. | |
| 2003/0092377 A1 * | 5/2003 | Hill | |
| 2004/0008643 A1 * | 1/2004 | Guturu et al. | |
| 2004/0033816 A1 * | 2/2004 | Semper et al. | |
| 2004/0037222 A1 * | 2/2004 | Kim et al. | |
| 2004/0185879 A1 * | 9/2004 | Kong et al. | |

FOREIGN PATENT DOCUMENTS

WO    WO 2004/059998    *    7/2004

* cited by examiner

*Primary Examiner*—William J. Deane, Jr.
(74) *Attorney, Agent, or Firm*—Stephen M. Gurey

(57) ABSTRACT

To avoid interference with the reverse link of a base station within an underlay area, a described method determines when to redirect and handover a mobile terminal that is still communicating on an adjacent carrier with a border base station within an overlay area but is within the coverage area of the base station in the underlay area. The method determines that redirection and handover to the base station in the underlay area should occur when together: (1) the power being received on the downlink from the base station in the underlay area exceeds the power being received on the downlink from the border base station within the overlay area by a first predetermined threshold that indicates that the mobile terminal is at the border of the overlay area; and (2) the sum of the power being received on the downlink from the underlay base station plus the power of the signal being transmitted by the mobile terminal to the base station within the overlay area is greater than a second predetermined threshold that indicates that the power being received by the base station in the underlay area from the transmitting mobile terminal can interfere with the operation of that base station.

9 Claims, 3 Drawing Sheets

METHOD OF HANDOFF AT THE BORDER BETWEEN CDMA UNDERLAY AND OVERLAY SYSTEMS

TECHNICAL FIELD

The present invention relates to mobile communications.

BACKGROUND OF THE INVENTION

Adjacent channel interference, due to what is known as a "near-far" situation, has always been a problem in the multi-carrier deployment of CDMA mobile systems. This near-far problem manifests itself at the border of an overlay area where additional CDMA carrier is deployed for capacity or other reasons. As a mobile terminal that is communicating with a border base station in the overlay area and operating at a carrier frequency deployed in that area moves across the border of the overlay area into the underlay area that is covered by base stations operating at other carrier frequencies, the mobile terminal is supposed to switch frequencies and be handed off to a second base station in the underlay area for continued communication at one of these other carrier frequencies, usually called a "hard" handoff. If, however, the mobile terminal doesn't switch on time, it is possible that it may come close to a base station in the underlay area, while communicating with and being power-controlled by the base station in the overlay area, thus continuing to operate at that overlay base station's carrier frequency. When that carrier frequency is adjacent to a carrier frequency used by the base station in the underlay area that it is now near, the power of the uplink signal transmitted by the mobile terminal may be sufficiently large to interfere with that base station's reverse link on the adjacent carrier. Specifically, due to the inability of the base station in the underlay area receiver to totally suppress adjacent channel signals, the magnitude of sideband of the uplink signal transmitted by the mobile terminal that is within an operating band of such an adjacent frequency carrier used by the base station in the underlay area, in a worst case scenario, can result in the total shut-down of that carrier by the underlay base station, causing that underlay base station to drop all ongoing calls and preventing customers from initiating and receiving new calls on that carrier. Alternatively, but deleterious to service, the generated interference can shrink the second base station's coverage area and preclude that base station from providing service to mobile terminals in its coverage area.

The above-described near-far situation is likely to be a problem in CDMA systems when an additional carrier at a carrier frequency $F_n$ is deployed as an overlay to alleviate capacity problems in underlay second or third generation (2G/3G) mobile systems. Various techniques have been incorporated on the network side to prevent the described near-far situation. These techniques generally utilize some signal quality or distance information gathered by the mobile terminal on carrier frequency $F_n$ to ensure that it redirected and handed off to a neighboring underlay base station in the underlay area (with carriers $F_1, F_2, \ldots, F_{n-1}$) before it can start interfering with the reverse link of any adjacent carrier used by any base station in the underlay area. A general problem with these prior art solutions is that redirect and handoff was often triggered before the underlay base station to which the mobile terminal is being redirected could reliably handle the call, causing frequent dropped calls. A Mobile Assisted Hard Handoff (MAHHO) mechanism defined by the IS-95B version of the CDMA standard has been implemented in 2G and 3G mobile terminals to alleviate this situation. In accordance with this mechanism, a mobile terminal, normally while in a border overlay base station's coverage area and when instructed to do so by the network, jumps to an underlay carrier, measures signal conditions coming from the base station transmitting at the underlay carrier, such as the mobile receive power at the underlay carrier frequency and the signal-to-noise-like $E_c/I_o$ measurement of the pilot signal transmitted by the underlay base station, returns to the overlay carrier, and reports the measured signal conditions back to the overlay base station. In response to these measurements, the base station can issue a timely redirection order.

A near-far situation is also likely to arise when the overlay system is the newly developed 1xEV system normally expected to be deployed on top of a 3G-1X underlay system to provide high speed data service at up to 2.4 Mb/s in selected commercial areas. A hybrid 1xEV/3G-1X mobile terminal will take advantage of the high-speed data 1xEV service in the overlay area where it is deployed. It will operate as a 3G-1X mobile terminal for lower-speed data service outside the overlay area and for voice service within both inside and outside the overlay area. Unlike the 3G and 2G systems, which are network-centric systems that are downward compatible, the 1xEV system was conceived to function largely as an independent stand-alone overlay system. Specifically, the IS-856 1xEV standard does not support the redirection from 1xEV to 3G-1X while on a data call, nor does it provide any means to inform a mobile terminal about the underlay system when it is idle so that it can make an informed autonomous decision when to switch. The 1xEV standard does provide, however, an option for the network to instruct all the mobiles in a base station's coverage area to unconditionally abandon its 1xEV carrier and to find a specific 3G-1X carrier. This creates a transition zone between the overlay 1xEV system and the underlay 3G-1X system, thereby wasting the capacity and the coverage of those 1xEV base stations on the border between the overlay and underlay system. The 1xEV standard also supports an option to redirect individual mobile terminals to the underlay system, but there is lack of support for any MAHHO type of reporting about signal quality of the target 3G-1X carrier. There is no reliable way, however, of determining whether or not a hybrid mobile terminal operating at the border and communicating with the overlay 1xEV system is likely to cause interference with a 3G-1X base station in the underlay area. Thus, a timely, reasonably reliable and non-wasting mechanism does not exist for switching from the overlay 1xEV system to the underlay 3G-1X system before interference with the a border base station in the underlay system may occur. The potential for a deleterious impact on the underlay 3G-1X system therefore could seriously impact the deployment of a 1xEV system.

SUMMARY OF THE INVENTION

The present invention recognizes that interference with the reverse link of a base station within an underlay area can occur when a mobile terminal that is still communicating on an adjacent carrier with a border base station within an overlay area but is within the coverage area of the base station in the underlay area, and that the following conditions are present together: (1) the power being received on the downlink from the base station in the underlay area exceeds the power being received on the downlink from the border base station within the overlay area by a first predetermined threshold that is indicative that the mobile terminal is at the border of the overlay area; and (2) the sum of the power being received on the downlink from the underlay base station plus the power of the signal being transmitted by the mobile terminal to the base station within the overlay area is greater than a second predetermined threshold that is indicative that the power of the signal received by the underlay base station from the transmitting mobile terminal can interfere with the operation of that underlay base station. When these two conditions are present together, the mobile terminal, depending upon the embodiment in which it is employed, is directed by the border base station in the overlay area to switch its carrier frequency to the adjacent-frequency carrier used by the base station in the underlay area, or autonomously switches its carrier to that frequency. In either case, the mobile terminal is handed off to the base station in the underlay area, discontinuing communication with the border base station in the overlay area and commencing communication with the base station in the underlay area. If the power being transmitted by the mobile terminal is essentially a constant, then that constant transmit power can be incorporated into the second predetermined threshold with which the received power is compared.

In a described embodiment, the invention is incorporated in a hybrid 1xEV/3G-1X mobile terminal that operates as a 1xEV mobile terminal within an overlay area that supports 1xEV high-speed data service, and as a 3G-1X mobile terminal that supports 3G-1X lower-speed data service in the underlay area and voice service in both the underlay and overlay areas. In this embodiment, the mobile terminal autonomously abandons 1xEV service and switches to 3G-1X service and connects to the 3G-1X base station in the underlay area when it determines that its 1xEV transmit power has the potential to interfere with the reverse link of a channel used by that base station within the underlay area. This occurs when the mobile terminal, operating in its 1xEV mode using a first carrier and actively engaged in a data call determines that together both: (1) the measured power of a downlink signal received by the mobile terminal from the 3G-1X base station that is operating at a carrier adjacent to the 1xEV carrier exceeds the measured power of the downlink signal received from the 1xEV base station with which the mobile terminal is communicating by more than a first predetermined threshold that indicates that the mobile terminal is at the border of the 1xEV overlay area; and (2) the sum of the measured power of the downlink signal received from the 3G-1X base station plus the power of the uplink signal being transmitted by the mobile terminal to the 1xEV base station is greater than a second predetermined threshold that indicates that the power received by the 3G-1X base station from the transmitting mobile terminal can interfere with the operation of that 3G-1X base station. Since the 1xEV mobile transmit power is often at or near its maximum power level during its data transmissions, the second threshold can be modified to incorporate that maximum power level. If the mobile terminal is not engaged in communication with the 1xEV base station, but is idle, then operative with the first condition is a second condition that specifies that the measured power of the downlink signal received from the 3G-1X base station be greater than that modified predetermined threshold that takes into account the maximum transmit power that the mobile terminal might transmit if a call is initiated and thereby interfere with operation of the 3G-1X base station when such call begins.

In determining whether the above-described conditions are both present, rather than using the total measured signal the power received from each of the two base stations at the mobile terminal, which when transmitted by each base station is dependent on the loading at that base station, the measured powers at which pilot signals transmitted by the base stations are received can be used instead, since the transmitted and received pilot powers are independent of base station loading. Further, in order to avoid the frequency-dependent effects of fast fading on the power measurements, power measurements made at multiple times or measurements periods can be extended before a determination is made that both conditions are present.

In a second embodiment, the present invention is incorporated in a system in which the mobile terminal employs a single technology rather than the dual technology employed in the hybrid 1xEV/3G-1X mobile terminal. In an embodiment in which multiple carrier are employed in different areas, a mobile terminal communicating with a base station at a carrier $F_n$ used in an overlay area is determined to have the potential to cause interference with the reverse link of a base station that operates in an underlay area at an adjacent carrier $F_{n-1}$ when conditions similar to (1) and (2) above occur together. Specifically, this happens when together: (1) the measured power received at a mobile terminal from a base station in the underlay area that operates at adjacent carrier $F_{n-1}$ exceeds the measured power at the mobile terminal of the downlink signal received from the base station with which the mobile terminal is communicating on the carrier $F_n$ by more than a first predetermined threshold that indicates that the mobile terminal is at the border of the overlay area; and (2) the measured power of the downlink signal received at the mobile terminal from the base station in the underlay area operating at carrier $F_{n-1}$ plus the power of the uplink signal currently being transmitted by the mobile terminal to the base station in the overlay area operating at carrier $F_n$ is greater than a second predetermined threshold that indicates that the power of the signal received by the base station in the underlay area from the transmitting mobile terminal at carrier $F_n$ can interfere with the operation of that base station. Unlike the situation with the hybrid 1xEV/3G-1X mobile terminal in which the overlay 1xEV system does not communicate with the underlay 3G-1X system, in a single technology system these determinations would normally be implemented at the base station in the overlay area based on measurements made by the mobile terminals and reported back to the base station. Thus, when both of these conditions are met together, the base station issues a redirection order signaling the mobile terminal to switch its carrier, thereby handing off the mobile terminal to the base station in the underlay area. As in the first embodiment, pilot measurements and power averaging and/or extended measurement periods can be used for improved reliability in determining that both conditions are met and that a redirection order should be made.

DETAILED DESCRIPTION

Figure 1:
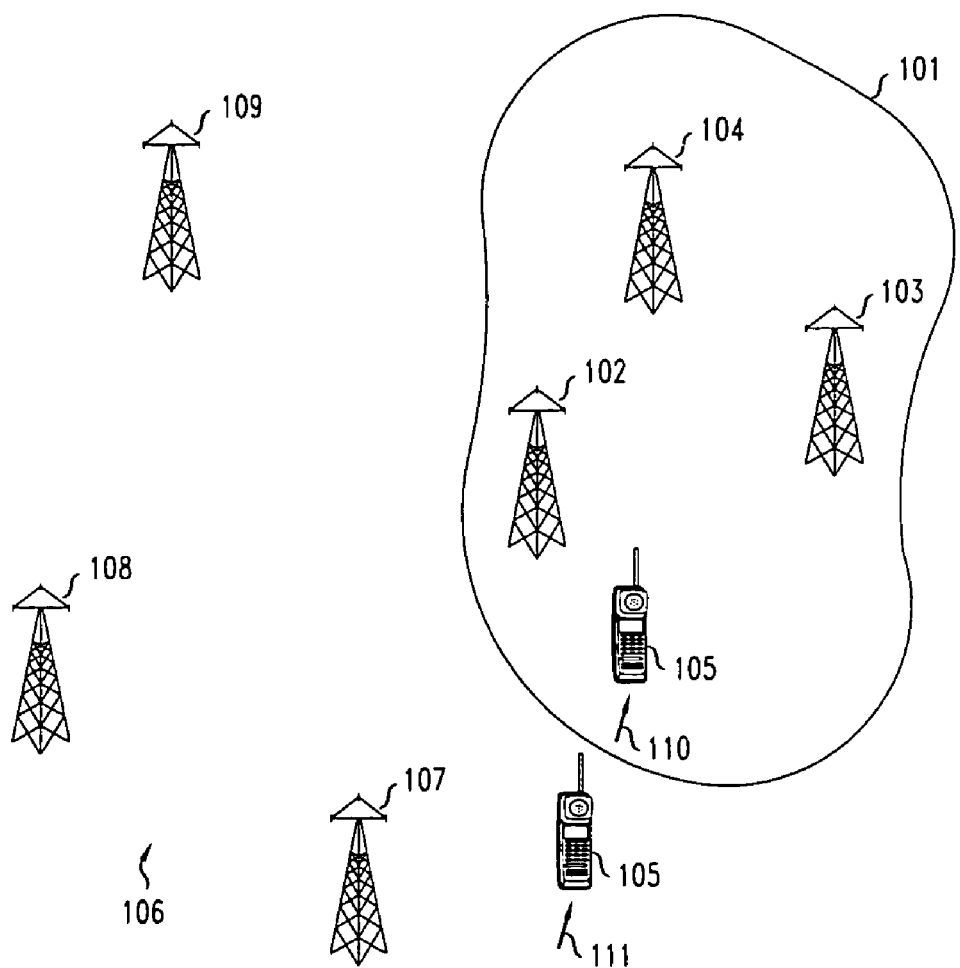
FIG. 1 shows a plurality of base stations within an overlay area of 1xEV coverage and a plurality of base station within an underlay area of 3G-1X coverage.

With reference to FIG. 1, a plurality of base stations are located within an overlay area 101 of a mobile service provider's area 100 consisting of the overlay area 101 and an underlay area 106. Although, for illustrative purposes, only three base stations 102, 103 and 104, are shown within overlay area 101, it should understood that a larger plurality of base stations would provide coverage to mobile subscribers within this area. In a described embodiment, the overlay area offers 1xEV high-speed data service to a user of a hybrid mobile terminal 105 that also functions as a 3G-1X mobile terminal. When operating in the latter mode, mobile terminal 105 provides voice and lower speed data service. Such a hybrid 1xEV/3G-1X terminal 105 is capable of originating and receiving high-speed data calls through the base stations 102–104 when it is within the overlay area 101. Also, when it is within the overlay area 101, the hybrid mobile terminal 105, operating in its 3G-1X mode, is capable of receiving and originating voice calls through 3G-1X equipment within the same base stations 102–104. When the mobile terminal 105 moves out of the overlay area into the underlay area 106 where only 3G-1X service-capable base stations 107, 108 and 109 are illustratively located, terminal 105 functions as a 3G-1X terminal that is capable of initiating and receiving voice calls and lower-speed data calls.

The hybrid terminal 105 is intended to operate in such a manner that if it moves out of the overlay area 101 and into the underlay area 106 while engaged in a high speed data call, then the data call will be reconnected on the 3G-1X network and continue at the lower data rate. The assumption in this plan of operation is that the loss of the 1xEV signal will be recognized by the mobile terminal as it leaves the 1xEV overlay coverage area and moves into the underlay 3G-1X coverage area, thus enabling it to switch to the 3G-1X mode and operate at a carrier used by the 3G-1X base stations 107–109 within the underlay area 106. As previously noted, however, as the mobile terminal 105 moves across the border from the overlay area 101 into the underlay area 106 from location 110 to 111, it may continue to receive a strong downlink 1xEV signal from a border base station 102, for example, with which it has been communicating within the overlay area 101, thereby remaining power-controlled by that base station in the overlay area 101. The carrier used by the 3G-1X base stations 107–109 in the underlay area 106 as well as by the 3G-1X equipment incorporated within the base stations 102–105 in the overlay area 101 is generally adjacent in frequency to the carrier used by the 1xEV equipment within base stations 102–105. As the mobile terminal 105 while engaged in a high-speed data call within the overlay area 101 through an overlay border base station, such as base station 102, moves out of that area and into the underlay area 106 it could, as previously described, remain in communication with and power-controlled by base station. Thus, as the mobile terminal 105 approaches a base station such as base station 107 in the underlay area 106, the power-controlled uplink signal being transmitted by the mobile terminal at a carrier adjacent to the carrier of base station 107 could, as previously described, cause interference to a reverse link of base station 107 resulting in the possible total shut down of use of that carrier by that base station. As previously noted, this is due to the finite suppression of the adjacent channel signals by that base station in the underlay area.

An embodiment of a mobile-based reselection and handoff method in accordance with the invention avoids the reverse link interference into a nearby 3G-1X base station as the mobile terminal moves out of the overlay area 101 and into the underlay area 106. Simultaneously, this reselection and handoff method maximizes the coverage of those 1xEV base stations on the border of the overlay area 101 in a manner that does not result in the premature switching from the 1XEV system to the underlay 3G-1X system before such switching needs to be performed to avoid interference, thereby maximizing the coverage of the border base stations in the 1xEV overlay area.

The method switches the hybrid mode 1xEV/3G-1X terminal from the 1xEV mode to the 3G-1X mode (thus changing carriers) when both of the following two conditions are met together: (1) the power received by the mobile terminal from the 3G-1X base station exceeds the power received from the 1xEV base station by a first predetermined threshold; and (2) the sum of the power received at the mobile terminal from the 3G-1X base station and the current transmit power of the mobile terminal to the 1xEV base station is greater than a second predetermined threshold when the mobile terminal is engaged in a data call, or the power received from the 3G-1X base station is greater than a third predetermined threshold when the terminal is idle. Mathematically, where dB units are assumed, these conditions are represented as:

$$MRx_{3G-1X} - MRx_{1xEV} > \delta \text{ dB} \quad (1)$$

AND $$MRx_{3G-1X} + MTx_{1xEV} > \Theta_0 \text{dBm, if connected on a data call} \quad (2A)$$

OR $$MRx_{3G-1X} > \Theta_1 \text{dBm, if idle} \quad (2B)$$

where in equation (2A) $MTx_{1xEV}$ is the actual transmit power of the 1xEV mobile terminal while it is connected on the data call, and $\Theta_0$ is the second predetermined threshold. If the mobile terminal is not connected on a data call but is idle, then the alternate threshold condition in equation (2B) using $\Theta_1$ as the third predetermined threshold can be used instead, based on the maximum possible $MTx_{1xEV}$ value. That maximum value is incorporated into this threshold because, even though the mobile terminal can not interfere with an underlay 3G-1X base station when idle and not transmitting, it still has the potential to start interfering when it makes access attempts while setting up a call. A worst-case condition based on the maximum assumed transmit power $MTx_{1xEV}$ is thus used is this case, which might limit the 1xEV coverage by a border base station slightly more than is necessary. Practically, this latter condition (2B) with the same predetermined threshold $\Theta_1$ can be used whether the mobile terminal is connected on a data call or is idle since, in the 1xEV mode, the transmit power of the mobile terminal is generally maintained at or near its maximum level regardless of its distance from the 1xEV base station so as to maximize the data rate.

The first condition, defined by equation (1), indicates redirection and handoff should occur when the power received from the overlay 1xEV system becomes sufficiently smaller than the power received from the underlay 3G-1X system. This ensures that the mobile terminal is actually leaving the overlay area 101. In the overlay area, although the power transmitted by a base station in the 1xEV mode is likely to be different than the power transmitted in the 3G-1X mode, the difference would normally be constant and thus the differences in the power received by the mobile terminal in each mode would be expected to be a constant. When the difference in received powers becomes too large (or larger than what is normally expected), the two signals received on adjacent carriers are likely to be coming from base stations at different locations (one coming from within the overlay area and the other coming from the underlay area), and the presence of this condition is indicative that the mobile terminal is in the border area.

The second condition, defined by equations (2A) and (2B), is counter-intuitive to what would be expected for initiating redirection of the mobile terminal. Redirection and handoff would logically be expected to be invoked when the power received by a mobile terminal from a 1xEV base station in the overlay area falls below some threshold rather than the conditions of equations (2A) and (2B), which indicate that the power received from a base station in the underlay 3G-1X system and the current 1xEV transmit power of the mobile terminal be larger than a fixed threshold. The key concept behind this second condition used in the present method is that in order to maximize the coverage of the border overlay base stations, the mobile terminal should not be redirected from the overlay 1xEV system and handed off to the underlay 3G-1X system before it is necessary to do so, i.e. the mobile terminal should be redirected and handed off only when there is an imminent danger that the adjacent channel power received at the nearby underlay 3G-1X base station will start interfering with the real signals present at that underlay base station. Based on the principle of electromagnetic reciprocity, however, when the mobile terminal gets close enough to the underlay 3G-1X base station so that it can start interfering with it through the adjacent channel, the power measured by the mobile terminal that it receives on the downlink channel from that same base station in the underlay system would also be large. Also, since the adjacent channel interference to the nearby underlay 3G-1X base station is directly proportional to the transmit power of the mobile terminal in the adjacent frequency band being used as the mobile terminal communicates with the border 1xEV base station in the overlay area, that current transmit power of the mobile terminal is taken into account in the condition (2A).

From a practical implementation standpoint, it is noted that simultaneous measurements of the received powers $MRx_{1xEV}$ and $MRx_{3G-1X}$ can be made in any hybrid 1xEV/3G-1X mobile terminal. This is because in the idle mode the mobile terminal monitors both carriers in a time-multiplexed fashion. In a slotted idle mode operation, a mobile terminal "sleeps", wakes up at predetermined intervals to monitor the 1xEV carrier, returns to "sleep", wakes up and retunes to monitor the 3G-1X carrier, etc. Similarly, during a 1xEV data call, the mobile terminal periodically jumps to the 3G-1X carrier to check for an incoming voice call, so that almost simultaneous measurements of the signal characteristics are possible on both carriers.

The power comparison defined by equation (1) can be performed in a straightforward manner based on the total received power in each carrier band that all CDMA mobile terminals continuously do for power control, handoff and possibly some other procedures. However, due to possibly unequal transmit powers and unequal propagation losses on two different carriers even when they come from the same set of antennas in the overlay area, several caveats are noted.

In both 1xEV and 3G-1X base station operations, instantaneous and average total transmit powers vary with loading, i.e. the number of active users and/or amount of data being transmitted by the base station. In the 1xEV case, however, the base station transmits a pilot intermittently at a fixed, maximum power (time-multiplex); in the 3G-1X case, the base station transmits a pilot continuously (code-multiplex), at about 15% (−7 dB) of the maximum base station power. In both cases, the pilot power can be calculated based on the measured total received power (which is already being measured for power control purposes) and the signal-to-noise-like parameter $E_c/I_o$ (routinely calculated for all pilots that a mobile terminal can "see" for handoff purposes). Thus, from a practical standpoint, the received powers $MRx_{1xEV}$ and $MRx_{3G-1x}$ of in equations (1), an (2A), and (2B) can be substituted with the values of the powers of the comparable pilots received from the 1xEV and 3G-1X base stations. The following equation illustrates the computation (in dB) of the received pilot power from the total received power measured by the mobile terminal:

$$MRx_{1xEV\,or\,3G-1x} = \text{Total\_}MRx_{1xEV\,or\,3G-1x} - E_c/I_o \qquad (3)$$

As previously noted, $E_c/I_o$ is a signal-to-noise-like pilot signal measurement. For the 1xEV case, all $E_c/I_o$ values are for the serving pilot, and in 3G-1X systems it is for either the best pilot, or the candidate pilot for the base station to which the mobile terminal is expected to be redirected.

While pilot-only power measurements of the signals received at the mobile terminal resolve the problems associated with variable total base station transmit powers, an additional problem in measuring these powers arises from the fact that a signal transmitted at two different frequencies, even if adjacent and transmitted through the same antennas, can have different path losses and thus be received at different power levels by the mobile terminal. Generally there are three major components of the path loss: distance-dependancy, shadowing and fast fading. Only fast fading effects, however, can be significantly different on adjacent carriers. Usually averaging the power measurements over an interval of approximately one second will alleviate the effects of fast fading, even for very slowly moving terminals. In a hybrid 1xEV/3G-1X terminal, however, the intervals available for actual measurements on 3G-1X systems are very short (a few tens of milliseconds, for example, depending on the terminal implementation, and whether or not a Quick Paging Channel is supported), and are spaced relatively far apart (once every 1 to 5 seconds, for example, depending on a Slot Cycle Index that operators chose for their network). A similar situation exists for power measurements of 1xEV operations when the mobile terminal is idle. When the mobile terminal is connected on a high-speed data call in 1xEV operation, however, the base station power measurements are continuous and the reliability of those measurements is high.

In order to avoid the variability in power measurements due to fast fading that could result in the mobile terminal switching when it is not necessary to do so or failing to switch when it is necessary, several solutions are available. For instance, if the mobile terminal is in the idle mode and the power measurements made during slotted operation indicate that the conditions (1) and (2B) are close to be satisfied, then the mobile terminal can spend a fraction of a second on the 1xEV system measuring the system power, switch to 3G-1X system and do the same, and then decide on which system to establish a data connection if an access attempt is made once the measurements are more reliable. The extra few seconds during idle mode needed to perform these measurements are not likely have a deleterious effect on service. If, rather than being in the idle state, the mobile terminal is in the connected state with the overlay 1xEV system when (1) and (2A) become close to being satisfied, then mobile terminal can shut down its transmitter, switch to 3G-1X operation to measure the received 3G-1X power more reliably, and then redirect, if necessary, once the confidence in the power measurements is high enough. Inasmuch as data transfer will be interrupted for possibly several seconds anyway if the redirection does need to be made, the extra overhead in performing this additional measurement step on the 3G-1X system would be tolerable. If, however, the additional measurements on the 3G-1X system show that a redirect from the overlay 1xEV system to the underlay 3G-1X system should not be executed, disadvantageously there would be unnecessary data transfer interruptions. Choosing the threshold δ high enough, however, is likely to mitigate the likelihood of this happening.

With respect to determining a value of the threshold δ in equation (1), if pilot measurements are used as a measure of the received powers MRx rather than actual received carrier powers, then, as noted above, $MRx_{1xEV}$ will normally be 7 dB stronger than $MRx_{3G-1X}$, with a few dBs added as a margin to account for differences due to power calibration of the base station transmitters, cabling/antenna differences, eventual inaccuracies in mobile received power measurements. This would result in an acceptable δ in the −3 to −5 dB range. In addition to that, an extra margin can be added to account for fast fading differences, depending on how the actual averaging is performed at the mobile.

An illustrative method of calculating the thresholds Θ to be used in the second condition defined by equations (2A) and (2B) for the above-described 1xEV/3G-1X border case is described. If $MTx_{1xEV}$ denotes the transmit power of the hybrid 1xEV/3G-1X mobile terminal in the 1xEV mode, Ant_Gain the to combined gain of base station transmit/receive and mobile antennas, and $Path\_Loss_{3G-1X}$ the path loss between hybrid mobile terminal and a 3G-1X base station receiver, the spurious power received from a nearby hybrid mobile by a 3G-1X base station receiver. $BTSRx_{1xEV \rightarrow 3G-1X}$ is given by:

$$BTSRx_{1xEV \rightarrow 3G-1X} = MTx_{1xEV} + \text{Ant\_Gain} - \text{Path\_Loss}_{3G-1X} - ACS_{BTS}, \quad (4)$$

where $ACS_{BTS}$ is the adjacent channel suppression for the 3G-1X base station. $ACS_{BTS}$, as well as the associated adjacent channel suppression for the mobile terminal, are usually in the 20–25 dB range, as they are less dependent on the actual implementation of the receive filters and more on the spillage that CDMA waveforms have into the adjacent band by design. In all IS-95 based CDMA systems one would thus usually have $$ACS_{BTS} \approx 20 \text{ to } 25 \text{ dB}. \quad (5)$$

The total or pilot power received by a mobile terminal in the 3G-1X mode, $MRx_{3G-1X}$, would be given according to the electromagnetic reciprocity principle by $$MRx_{3G-1X} = BTSTx_{3G-1X} + \text{Ant\_Gain} - \text{Path\_Loss}_{3G-1X} \quad (6)$$

where $BTSTx_{3G-1X}$ is the power transmitted by the underlay 3G-1X base station, either total or in the pilot signal. Based on equations (4) and (6), the adjacent channel interference power at the 3G-1X base station from the mobile terminal operating in the 1xEV mode can be estimated as:

$$BTSRx_{1xEV \rightarrow 3G-1X} = MTx_{1xEV} + MRx_{3G-1X} - BTSTx_{3G-1X} - ACS_{BTS} \quad (7)$$

where $BTSTx_{3G-1X}$ can be either the total transmit power, or the transmitted pilot power, depending on whether equation (3) is used or not. Given that most base stations have a maximum transmit power in the 42–43 dBm range, and that the pilot is at −7 dB level below the maximum power, one can normally use $$BTSTx_{3G-1X} \approx 35-36 \text{ dBm}. \quad (8)$$

If the adjacent channel interference power $BTSRx_{1xEV \rightarrow 3G-1X}$ is high enough compared to the normal thermal noise power, the coverage of the underlay 3G-1X base station would start to shrink. A reasonable tolerable value of $BTSRx_{1xEV \rightarrow 3G-1X}$ would be the one that would cause the base station desensitization of ε dB, where a maximum value of ε in the order of $$\epsilon \approx 1 \text{ dB} \quad (9)$$

would be wanted. The normal noise power at the base station is given by the theoretical thermal noise level of −113 dBm, augmented by the base station Noise Figure, NF. The maximum level of the interference can then be calculated from $$10^{(-113+NF)/10} + MRx_{1xEV \rightarrow 3G-1X} < 10^{(-113+NF+\epsilon)/10}. \quad (10)$$

In most base stations, the Noise Figure numbers would be about 5 dB, i.e.

$$NF \approx 5 \text{ dB} \quad (11)$$

With the aid of equation (7), interference would be prevented if the following condition holds:

$$MTx_{1xEV} + MRx_{3G-1X} - BTSTx_{3G-1X} - ACS_{BTS} < 10 \times \log_{10} \{10^{(-113+NF+\epsilon)/10} - 10^{(-113+NF)/10}\} \quad (12)$$

which can be rewritten as:

$$MRx_{3G-1X} + MTx_{1xEV} < \Theta_0, \quad (13)$$

where $\Theta_0$ is defined as $$\Theta_0 = 10 \times \log 10\{10^{(-113+NF+\epsilon)/10} - 10^{(-113+NF)/10}\} + BTSTx_{3G-1X} + ACS_{BTS}. \quad (14)$$

By using values from equations (5), (8), (9) and (11), as an example, $\Theta_0 \approx -55$ dBm. For standard 1xEV mobiles with a maximum power of 23 dBm, idle threshold $\Theta_1$ would be at −78 dBm, which in practice could be rounded to −80 dB. One implementation of the critera (2A) and (2B) could thus be $$MRx_{3G-1X} + MTx_{1xEV} > -55 \text{ dBm, if connected} \quad (17A)$$

$$MRx_{3G-1X} > -80 \text{ dBm, if idle.} \quad (17B)$$

Given that 1xEV transmit power is often very close to its maximum, the idle mode threshold (17B) can be used for both the idle state and when the data call is connected, with little performance penalty, i.e $$MRx_{3G-1X} > -80 \text{ dBm} \quad (18)$$

is the second criteria that can be used in both the idle and connected modes of operation.

Figure 2:
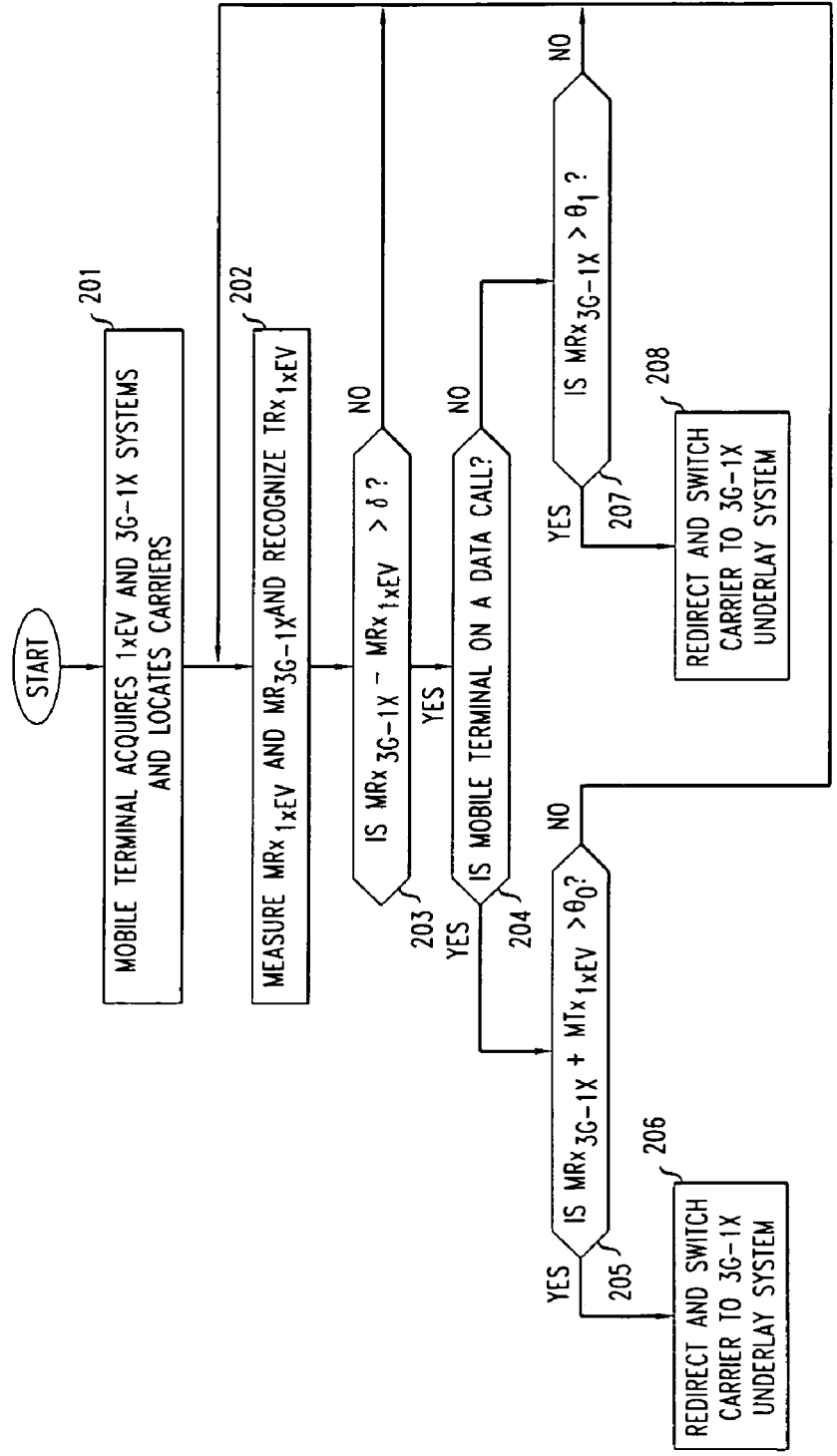
FIG. 2 is a flowchart that shows an embodiment of a method for determining whether to switch from 1xEV service in an overlay area to 3G-1X service in an underlay area, in accordance with the present invention.

The flowchart in FIG. 2 summarizes the steps continuously performed at a mobile terminal to determine whether to autonomously switch carrier frequencies and handoff from a base station within the 1xEV overlay area to a base station in the 3G-1X underlay area. At step 201, when the mobile terminal is in the 1xEV overlay area and is turned on, it acquires both the 1xEV and 3G-1X systems using a preferred roaming list in a conventional manner and locates the respective 1xEV and 3G-1X carriers, which generally are adjacent in frequency. As previously described, while in the idle mode, the mobile terminal alternately jumps back and forth between the 1xEV carrier and the 3G-1X carrier, enabling receive power measurements to be made at each carrier. Also, while the mobile terminal is connected on a data call, it periodically jumps to the 3G-1X carrier allowing receive power measurements to be made on that carrier. At step 202, therefore, whether on a data call or idle, the mobile terminal measures the receive power, $MRx_{1xEV}$, on the 1xEV carrier, the receive power, $MRx_{3G-1X}$, on the adjacent 3G-1X carrier, and, if on a data call, recognizes the value of its own transmit power, $TRx_{1xEV}$. As afore-noted, each of these received power measurements can be those of the actual total power received by the mobile terminal from the base stations or the received power of the pilot signals transmitted by the base stations. As previously discussed, measurements of the latter resolve problems associated with loading-dependent base station transmit powers. Also, these measurements can be made in a manner previously described to mitigate the effects of fast fading. At step 203, a determination is made whether the difference between $MRx_{3G-1X}$ and $MRx_{1xEV}$ is greater than the threshold $\delta$ (condition [1]). If it is not, the process returns to step 202 to await the next receive power measurements. If the first condition defined by equation (1) is met at step 203, indicating that the mobile terminal is at the border, a determination is made, at step 204, whether the mobile terminal is currently on a data call. If it is, at step 205, a determination is made whether the sum of $MRx_{3G-1X}$ and $MTx_{1xEV}$ is greater than the threshold $\Theta_0$ (equation [2A]). If the two conditions defined by equations (1) and (2A) are met, then, at step 206, the mobile terminal switches carrier frequencies and is redirected and handed off to the 3G-1X base station in the underlay area. If the second condition defined by equation (2A) is not met at step 205, the process returns to step 202 to await the next receive power measurements. If, at step 204, it is determined that the mobile terminal is not on a data call, then, at step 207, a determination is made whether $MRx_{3G-1X}$ is greater than the threshold $\Theta_1$ (equation [2B]). If the first and second conditions defined by equations (1) and (2B) are met, then, at step 208, the mobile terminal is redirected and handed off to the 3G-1X station in the underlay area. If the second condition defined by equation (2B) is not met at step 207, the process returns to step 202 to await the next receive power measurements. As previously noted, in a practical system, the transmit power $MTx_{1xEV}$ can be considered a constant and combined with the threshold $\Theta_0$ thereby making it equal to threshold $\Theta_1$. Thus, steps 204, 207 and 208 could be eliminated.

As earlier noted, confidence in power measurements can be improved by averaging the receive power measurements over longer measurement periods, or by taking additional power measurements before determining that both conditions are met and that redirection and handoff is effected.

As earlier noted, an embodiment of the invention could be used in a second or third generation (2G/3G) systems where an additional carrier at frequency $F_n$ is employed in an overlay area to alleviate capacity problems over an underlay area with carrier frequencies $F_1, F_2, \ldots, F_{n-1}$, where carriers $F_{n-1}$ and $F_n$ are adjacent to each other. Thus, the methodology described above can be applied to provide an improved handoff mechanism over the MAHHO mechanism currently employed.

For this embodiment for the case of the multiple carrier deployment of the single technology, the equivalent to the conditions defined by equations (1) and (2A) above would be:

$$MRx_{F_{n-1}} - MRx_{F_n} > \Delta \text{ dB} \tag{19}$$

AND $$MRx_{F_{n-1}} + MTx_{F_n} > \Psi \text{ dBm;} \tag{20}$$

The first condition defined by equation (19) indicates that redirection of a mobile terminal operating in the overlay area should occur when the receive power at the mobile terminal from the base station in the underlay area operating at carrier $F_{n-1}$ exceeds the receive power from the base station in the overlay area operating at adjacent carrier $F_n$ by more than $\Delta$ dB. When the mobile terminal is in the overlay area, the power received on both carriers would be expected to be similar, coming from a single base station that operates at both carrier frequencies and which usually transmits both carriers at identical power levels. When the mobile terminal is at the border of the overlay coverage area, however, the two signals are likely to be coming from two different base stations and the difference would be larger than what normally would be expected.

The second condition defined by equation (20) indicates that redirection should occur when the sum of the receive power at the mobile terminal from the base station in the overlay area operating at $F_{n-1}$ plus the power being transmitted by the mobile terminal at carrier $F_n$ exceeds the threshold of $\Psi$ dBm. These conditions are likely to be applied only when connected on a call, but could be also applied when idle. Currently, 2G/3G systems have other methods in place to ensure redirection of idle mobiles, such as via a Channel List message sent on the overhead channels.

As in the 1xEV/3G-1X overlay embodiment previously described, the use of total received powers to determine whether both of these conditions are present is subject to load-dependent base station transmit powers. Thus, pilot power measurements can be used instead. For the single system multi-carrier overlay system, however, unlike the 1xEV/3G-1X overlay embodiment, the pilot powers would be the same when they are transmitted from the same base station. A $\Delta$ in the order of a few dB can thus be used for the first condition defined in equation (19). A mobile manufacturer would likely determine an actual value for $\Delta$ that includes a margin added for fast fading effects, and which depends on an implementation of an averaging mechanism and the accuracy of the power measurements of the mobile terminals themselves. Also, as in the first embodiment, confidence in power measurements can be improved by averaging the receive power measurements over longer measurement periods, or by taking additional power measurements before determining that both conditions are met and that redirection and handoff is effected.

The exemplary methodology used herein above for determining values for the threshold $\Theta_0$ used in equation (2A) can also be used to determine the threshold $\Psi$ used in equation (20), with the same numeric values. It should be noted, however, that unlike 1xEV data calls in which the mobile terminal transmits at an essentially constant maximum power level, for voice calls, the mobile terminal transmit power can be significantly below the maximum in many overlay border areas. Thus, if the actual mobile transmit power $MTx_{F_n}$ is used in equation (20) rather than a constant maximum transmit power, improved performance will be achieved in that premature switching to the underlay system will not occur, thereby extending the coverage of the border base station in the overlay area. A constant transmit power level could, however, be used in equation (20) for the second condition with a somewhat disadvantageous resultant switching and redirection to the underlay system earlier than is necessary to avoid interference with the base station in the underlay system.

Unlike the 1xEV/3G-1X embodiment in which the conditions defined by equations (1), (2A) and (2B) are determined by the mobile terminal so that it can autonomously switch frequencies and handoff to the underlay system, in the single system embodiment, these conditions are likely to be by a border base station in the overlay area while on a call with a mobile terminal. Thus, the mobile terminal would report the receive power measurements $MRx_{F_n}$ and $MRx_{F_{n-1}}$ at frequencies $F_n$ and $F_{n-1}$, respectively, and its transmit power $MTx_{F_n}$ to the border base station. The border base station then determines, using the first and second conditions as defined by equations (19) and (20), whether to issue a handoff direction message to the mobile terminal to switch its frequency from $F_n$ to $F_{n-1}$ and handoff to the base station in the underlay area. Although the two conditions conditions could also be used when the mobile terminal is in the idle mode, with equation (20) appropriately modified, presently available methods could also be used in the idle mode.

Figure 3:
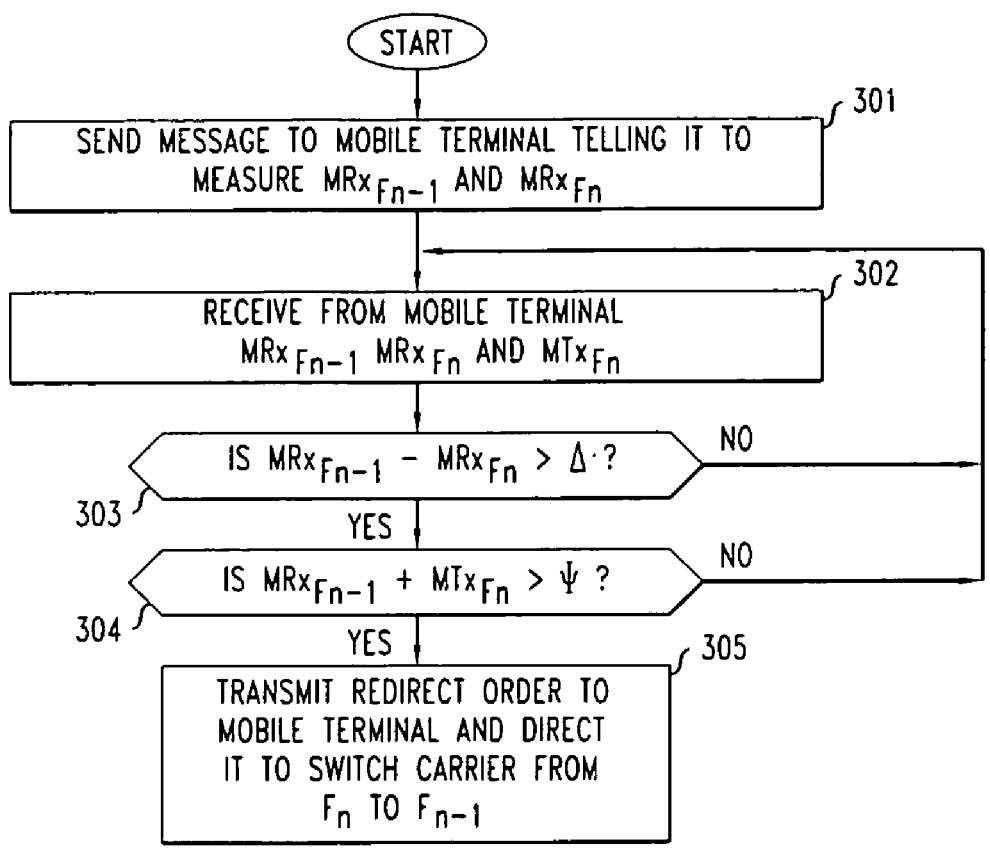
FIG. 3 is a flowchart that shows an embodiment of a method at a border base station in an overlay area for determining whether to issues a redirection order to a mobile terminal to switch carrier frequencies for handoff to a base station in an underlay area, in accordance with the present invention.

FIG. 3 summarizes the steps performed at a base station in an overlay area for determining whether to send a redirect order to a mobile terminal that is engaged in a voice call in the overlay area and operating at carrier Fn. At step 301, the border base station sends a message during a call to the mobile terminal telling it when and how frequently it should jump between carrier frequencies and measure its received power at these frequencies. At step 302, the base station receives from the mobile terminal over the traffic channel during an ongoing call, the current power measurements of $MRx_{F_n}$, $MRx_{F_{n-1}}$, and $TRx_{F_n}$. At step 303, a determination is made whether the difference between $MRx_{F_{n-1}}$ and $MRx_{F_n}$ is more than the threshold $\Delta$ dB. If it is not, the process returns to step 302 to await receipt of the next periodically transmitted power measurements from the mobile terminal. If the difference is more than the threshold $\Delta$ dB, a determination is made, at step 304, whether the sum of $MRx_{F_{n-1}}$ and $MTx_{F_n}$ is greater than the threshold $\Psi$ dBm. If it is not, then the process returns to step 302 to await receipt of the next power measurements from the mobile terminal. If the sum is greater than $\Psi$ dBm, then both conditions are met and the uplink signal of the mobile terminal could interfere with reverse channel in a nearby base station in the underlay area. Accordingly, at step 305, the base station transmits a redirect order to the mobile terminal directing it to switch carrier frequencies from $F_n$ to $F_{n-1}$, handing off the mobile terminal to the base station in the underlay area.

Although described in conjunction with a specific multiple system 1xEV/3G-1X system, and a single carrier 2G/3G system, the present invention could be used in any type of all voice, all data, or voice and data mobile communications system in which carrier usage is not continuous and a near-far situation may exist. Further, the exemplary determinations of the thresholds used in equations (1), (2A), (2B), (19) and (20) are for illustration only for the specific systems described with the assumptions made as described. Depending on the system to which the described conditions are to be applied, the appropriate threshold values could be determined by one skilled in the art.

The foregoing merely illustrates the principles of the invention. It will thus be appreciated that those skilled in the art will be able to devise various arrangements, which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be further appreciated by those skilled in the art that the block diagrams herein represent conceptual views embodying the principles of the invention. Similarly, it will be appreciated that the flowchart represents various processes that may be substantially represented in computer readable medium and so executed by a computer or processor, whether or not such computer or processor is explicitly shown.

In the claims hereof, any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

The invention claimed is:

1. A method at a mobile terminal, the mobile terminal being operative at a first carrier frequency with a base station in an area that overlays an underlay area comprising one or more base stations operating at an adjacent carrier frequency, the base station in the overlay area being in a first system that is operative in accordance with a first standard and the base stations in the underlay area being in a second system that is operative in accordance with a second standard different from the first, the method comprising:

switching the mobile terminal from operation in accordance with the first standard at the first carrier to operation in accordance with the second standard at the adjacent carrier and redirecting it to a base station in the underlay area if both (1) the sum of measured power of a downlink signal received from the base station in the underlay area at the adjacent carrier plus, if it is transmitting, a present transmit power of an uplink signal being transmitted by the mobile terminal at the first carrier to the base station in the overlay area, is greater than a first predetermined threshold that indicates that the power received by the base station in the underlay area from the mobile terminal when the mobile terminal is transmitting an uplink signal at the first carrier can interfere with operation of a reverse link of that base station in the underlay area, and (2) if the difference between the measured power of the downlink signal received from the base station in the underlay area at the adjacent carrier and a measured power of a downlink signal received from the base station in the overlay area with which the mobile terminal is communicating at the first carrier is greater than a second predetermined threshold that indicates that the mobile terminal is near the border of the overlay area.

2. The method of claim 1 wherein the mobile terminal is a hybrid terminal operating in accordance with both 1xEV and 3G-1X standards, the overlay area is a service area operating in accordance with 1xEV standards (a 1xEV service area) and the underlay area is a service area operating in accordance with 3G-1X standards (a 3G-1X service area), the first carrier frequency being a frequency at which high-speed data service is provided in the 1xEV service area and the adjacent carrier frequency being a frequency at which voice and lower-speed data service in accordance with 3G-1X standards is provided in the underlay area.

3. The method of claim 1 wherein if the mobile terminal is idle and not transmitting, then it is switched to the adjacent carrier and redirected to the base station in the underlay area if the measured power of the downlink signal received from the base station in the underlay area at the adjacent carrier indicates that when the mobile terminal starts transmitting an uplink signal at the first carrier the power received by the base station in the underlay area from the mobile terminal could interfere with operation of the reverse link of that base station in the underlay area.

4. The method of claim 1 wherein a maximum transmit power of the mobile terminal is used as the present transmit power of the mobile terminal when the mobile terminal is transmitting for determining if the power received by the base station in the underlay area from the mobile terminal can interfere with the operation of the reverse link of that base station in the underlay area.

5. The method of claim 3 wherein a maximum transmit power of the mobile terminal is used when the mobile terminal is idle for determining if when the mobile starts transmitting the power received by the base station in the underlay area from the mobile terminal could interfere with the operation of the reverse link of that base station in the underlay area.

6. The method of claim 1 wherein the measured power of the downlink signal at the first carrier and the measured power of the downlink signal at the adjacent carrier are determined by measuring a receive power of a pilot signal received from the base station in the overlay area and a receive power of a pilot signal received from the base station in the underlay area, respectively.

7. The method of claim 6 wherein the mobile terminal averages the magnitudes of a plurality of receive power measurements before determining that it should switch carrier frequencies and be redirected to the base station in the underlay area.

8. The method of claim 6 wherein the mobile terminal extends a period for measuring the receive power from the base station in the overlay area and the receive power from the base station in the underlay area before determining that it should switch carrier frequencies and handoff to the base station in the underlay area.

9. A method at a base station, the base station being operative at a first carrier frequency with at least one mobile terminal, the base station being in an area that overlays an underlay area comprising one or more base stations operating at an adjacent carrier frequency, the base station in the overlay area being in a first system that is operative in accordance with a first standard and the base stations in the underlay area being in a second system that is operative in accordance with a second standard different than the first, the method comprising:

sending a redirection order to the mobile terminal to switch its operation in accordance with the first standard at the first carrier to operation in accordance with the second standard at the adjacent carrier and be redirected to the base station in the underlay area if both (1) of the sum of a received value of a power measured by the mobile terminal of a downlink signal being received from a base station in the underlay area at the adjacent carrier plus a received value of the power of the uplink signal being transmitted by the mobile terminal, is greater than a first predetermined threshold that indicates that the power being received by the base station in the underlay area from the mobile terminal when the mobile terminal is transmitting the uplink signal at the first carrier can interfere with operation of a reverse link of that base station in the underlay area, and (2) the difference between the received value of the measured power of the downlink signal being received from the base station in the underlay area at the adjacent carrier and a received value of the measured power of the downlink signal being received from the base station in the overlay area with which the mobile terminal is presently communicating at the first carrier is greater than a second predetermined threshold that indicates that the mobile terminal is near the border of the overlay area.

\* \* \* \* \*